(12) United States Patent
Christopher et al.

(10) Patent No.: US 11,427,493 B2
(45) Date of Patent: Aug. 30, 2022

(54) METHOD AND APPARATUS FOR MANAGING GLASS RIBBON COOLING

(71) Applicant: CORNING INCORPORATED, Corning, NY (US)

(72) Inventors: Rebecca Elaine Christopher, Lexington, KY (US); Laurie Diana Dunning, Salvisa, KY (US); Shawn Rachelle Markham, Harrodsburg, KY (US); Vinay A Patel, Lexington, KY (US)

(73) Assignee: Corning Incorporated, Corning, NY (US)

( * ) Notice: Subject to any disclaimer, the term of this patent is extended or adjusted under 35 U.S.C. 154(b) by 306 days.

(21) Appl. No.: 16/472,467

(22) PCT Filed: Dec. 21, 2017

(86) PCT No.: PCT/US2017/067963
§ 371 (c)(1),
(2) Date: Jun. 21, 2019

(87) PCT Pub. No.: WO2018/119272
PCT Pub. Date: Jun. 28, 2018

(65) Prior Publication Data
US 2021/0130216 A1 May 6, 2021

Related U.S. Application Data

(60) Provisional application No. 62/437,256, filed on Dec. 21, 2016.

(51) Int. Cl.
*C03B 17/06* (2006.01)

(52) U.S. Cl.
CPC .................. *C03B 17/067* (2013.01)

(58) Field of Classification Search
None
See application file for complete search history.

(56) References Cited

U.S. PATENT DOCUMENTS 1,887,414 A * 11/1932 Le Roy .................. C03B 15/18
65/243
3,682,609 A * 8/1972 Dockerty .............. C03B 17/064
65/327

(Continued)

FOREIGN PATENT DOCUMENTS

CN   102190425 A    9/2011
CN   102762507 A    10/2012

(Continued)

OTHER PUBLICATIONS

Taiwanese Patent Application No. 106144060, Office Action dated Jul. 9, 2021, 3 page (English Translation Only); Taiwanese Patent Office.

(Continued)

*Primary Examiner* — Jodi C Franklin (57) ABSTRACT

A method and apparatus for manufacturing a glass article includes flowing a glass ribbon through a transition region, heating the glass ribbon with a heating mechanism housed in the transition region, cooling the glass ribbon with a cooling mechanism housed in the transition region, wherein the cooling mechanism extends between the heating mechanism and the glass ribbon, and shielding the glass ribbon with a shielding mechanism that extends between the cooling mechanism and at least one of first and second bead regions of the glass ribbon.

12 Claims, 4 Drawing Sheets

(56) References Cited

U.S. PATENT DOCUMENTS

| | | | | |
|---|---|---|---|---|
| 4,365,986 A * | 12/1982 | Nayak | C03B 5/0275 | 373/35 |
| 8,141,388 B2 * | 3/2012 | Burdette | C03B 17/067 | 65/268 |
| 8,176,753 B2 * | 5/2012 | Kahlout | C03B 17/067 | 65/90 |
| 8,857,215 B2 * | 10/2014 | Dale | C03B 29/10 | 65/119 |
| 9,938,177 B2 * | 4/2018 | Welles | C03B 17/064 | |
| 9,975,800 B2 | 5/2018 | Dannoux et al. | | |
| 2004/0154336 A1 * | 8/2004 | Pitbladdo | C03B 17/064 | 65/195 |
| 2005/0120748 A1 * | 6/2005 | Xun | C03B 17/067 | 65/53 |
| 2005/0268659 A1 * | 12/2005 | Rhoads | C03B 17/064 | 65/53 |
| 2006/0081009 A1 * | 4/2006 | Maldonado | C03B 17/067 | 65/195 |
| 2007/0062219 A1 * | 3/2007 | Blevins | C03B 18/22 | 65/91 |
| 2008/0282736 A1 * | 11/2008 | Filippov | C03B 17/064 | 65/90 |
| 2009/0100873 A1 * | 4/2009 | Allan | C03B 17/064 | 65/85 |
| 2010/0218557 A1 * | 9/2010 | Aniolek | C03B 17/067 | 65/97 |
| 2011/0126591 A1 * | 6/2011 | Chalk | C03B 17/064 | 65/84 |
| 2011/0209502 A1 | 9/2011 | El Kahlout et al. | | |
| 2011/0239708 A1 * | 10/2011 | Nishiura | C03B 17/068 | 65/199 |
| 2011/0314870 A1 * | 12/2011 | Fredholm | C03B 17/068 | 65/94 |
| 2012/0318020 A1 * | 12/2012 | Delia | C03B 17/067 | 65/29.19 |
| 2013/0015180 A1 * | 1/2013 | Godard | C03C 23/0065 | 219/759 |
| 2013/0180285 A1 * | 7/2013 | Kariya | C03B 17/064 | 65/29.11 |
| 2013/0180288 A1 * | 7/2013 | Kariya | C03B 25/12 | 65/83 |
| 2014/0137601 A1 * | 5/2014 | Aburada | C03B 17/067 | 65/29.18 |
| 2014/0216107 A1 * | 8/2014 | Brunello | C03B 17/068 | 65/53 |
| 2015/0329401 A1 * | 11/2015 | Chung | C03B 17/067 | 65/53 |
| 2016/0016838 A1 * | 1/2016 | Aburada | C03B 17/067 | 65/29.14 |
| 2016/0046518 A1 * | 2/2016 | Geathers | C03B 17/067 | 65/85 |
| 2016/0083281 A1 * | 3/2016 | Ahrens | G05D 23/1917 | 65/29.14 |
| 2016/0102008 A1 * | 4/2016 | Abramov | C03B 17/064 | 65/97 |
| 2016/0107916 A1 * | 4/2016 | Welles | C03B 17/064 | 65/53 |
| 2016/0207819 A1 | 7/2016 | Cleary et al. | | |
| 2016/0297703 A1 * | 10/2016 | Aniolek | C03B 17/064 | |
| 2017/0362112 A1 * | 12/2017 | Lansberry | C03B 17/064 | |
| 2017/0369353 A1 | 12/2017 | Delia et al. | | |
| 2019/0119140 A1 * | 4/2019 | Feenaughty | F27B 5/18 | |
| 2020/0270161 A1 * | 8/2020 | Delia | C03B 17/064 | |
| 2020/0325060 A1 * | 10/2020 | Sakurabayashi | C03B 5/027 | |
| 2021/0032149 A1 * | 2/2021 | Franzen | C03B 17/064 | |

FOREIGN PATENT DOCUMENTS

| | | |
|---|---|---|
| CN | 103608307 A | 2/2014 |
| CN | 204918351 U | 12/2015 |
| JP | 2014-518190 A | 7/2014 |
| TW | 201139301 A | 11/2011 |
| TW | 201309604 A | 3/2013 |
| TW | 201332906 A | 8/2013 |
| WO | 2006/044929 A1 | 4/2006 |
| WO | 2012/133842 A1 | 10/2012 |
| WO | 2012/174353 A2 | 12/2012 |
| WO | 2013082360 A1 | 6/2013 |
| WO | 2014/193780 A1 | 12/2014 |

OTHER PUBLICATIONS

International Search Report and Written Opinion of the International Searching Authority; PCT/US2017/067963; dated Apr. 9, 2018; 11 Pages; European Patent Office.

Chinese Patent Application No. 201780079829.7, Office Action dated Jun. 9, 2021, 5 pages (English Translation Only), Chinese Patent Office.

Japanese Patent Application No. 2019-533168, Office Action dated Sep. 22, 2021, 10 pages (5 pages of English Translation and 5 pages of Original Document), Japanese Patent Office.

* cited by examiner

METHOD AND APPARATUS FOR MANAGING GLASS RIBBON COOLING

This application is a national stage entry of International Application Serial No. PCT/US2017/067963 filed on Dec. 21, 2017, which claims the benefit of priority under 35 U.S.C. § 119 of U.S. Provisional Application Ser. No. 62/437,256 filed on Dec. 21, 2016, the contents of each are relied upon and incorporated herein by reference in their entirety

FIELD

The present disclosure relates generally to methods and apparatuses for manufacturing glass articles and more particularly to methods and apparatuses that provide improved management of glass ribbon cooling in the manufacture of glass articles.

BACKGROUND

In the production of glass articles, such as glass sheets for display applications, including televisions and hand held devices, such as telephones and tablets, the glass articles can be produced from a ribbon of glass that continuously flows through a housing. The housing can include a transition region, wherein the newly formed ribbon of glass is cooled with radiation being the dominant form of heat transfer. The amount of radiation heat transfer from the glass ribbon is, in part, a function of the emissivity of the ribbon wherein, all else being equal, thicker regions of the glass ribbon radiate more heat than thinner regions. This, in turn, leads to thicker regions cooling faster than thinner regions, which can in cause the thicker regions to set up out of plane with other areas of the ribbon, which can, in turn cause undesirable effects, such as sheet breakage, as the glass ribbon continues to cool. Accordingly, under such conditions, it would be desirable to enable more uniform heat transfer while accounting for differences in ribbon thickness.

SUMMARY

Embodiments disclosed herein include an apparatus for manufacturing a glass article. The apparatus includes a transition region configured to house a glass ribbon. The glass ribbon includes a first edge, a second edge on the opposite side of the glass ribbon as the first edge in the widthwise direction, a central region extending between the first edge and the second edge in the widthwise direction, a first bead region extending between the first edge and the central region in the widthwise direction, and a second bead region extending between the second edge and the central region in the widthwise direction. The transition region includes a heating mechanism configured to apply heat from a heat source to the glass ribbon. The transition region also includes a cooling mechanism configured to extend between the heating mechanism and the glass ribbon. In addition, the transition region includes a shielding mechanism configured to extend between the cooling mechanism and at least one of first and second bead regions of the glass ribbon.

Embodiments disclosed herein also include a method for manufacturing a glass article. The method includes flowing a glass ribbon through a transition region, the glass ribbon comprising a first edge, a second edge on the opposite side of the glass ribbon as the first edge in the widthwise direction, a central region extending between the first edge and the second edge in the widthwise direction, a first bead region extending between the first edge and the central region in the widthwise direction, and a second bead region extending between the second edge and the central region in the widthwise direction. In addition, the method includes heating the glass ribbon with a heating mechanism housed in the transition region. The method also includes cooling the glass ribbon with a cooling mechanism housed in the transition region, wherein the cooling mechanism extends between the heating mechanism and the glass ribbon. The method additionally includes shielding the glass ribbon with a shielding mechanism that extends between the cooling mechanism and at least one of first and second bead regions of the glass ribbon.

Additional features and advantages of the embodiments disclosed herein will be set forth in the detailed description which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description present embodiments intended to provide an overview or framework for understanding the nature and character of the claimed embodiments. The accompanying drawings are included to provide further understanding, and are incorporated into and constitute a part of this specification. The drawings illustrate various embodiments of the disclosure, and together with the description serve to explain the principles and operations thereof.

DETAILED DESCRIPTION

Reference will now be made in detail to the present preferred embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the term "transition region" refers to a region in a glass manufacturing apparatus wherein the glass is being cooled from a relatively higher to lower temperature and, at its highest temperature in the transition region, the glass is at a temperature at or below its softening point (i.e., at or above a viscosity of $10^{7.6}$ poise) and, at its lowest temperature in the transition region, the glass is at a temperature at or above its annealing point (i.e., at or below a viscosity of $10^{13}$ poise). Typically, in the transition region, the glass may also be expected to be in a temperature range wherein radiation is the dominant form of heat transfer from the glass ribbon, such as when the glass ribbon is at a temperature above about 700° C., including a temperature range between about 700° C. and about 1000° C.

As used herein, the term "heating mechanism" refers to a mechanism that provides reduced heat transfer from at least a portion of the glass ribbon relative to a condition where such heating mechanism is absent. The reduced heat transfer could occur through at least one of conduction, convection, and radiation. For example, the heating mechanism could provide for a reduced temperature differential between at least a portion of the glass ribbon and its environment relative to a condition where such heating mechanism is absent.

As used herein, the term "cooling mechanism" refers to a mechanism that provides increased heat transfer from at least a portion of the glass ribbon relative to a condition where such cooling mechanism is absent. The increased heat transfer could occur through at least one of conduction, convection, and radiation. For example, the cooling mechanism could provide for an increased temperature differential between at least a portion of the glass ribbon and its environment relative to a condition where such cooling mechanism is absent.

As used herein, the term "shielding mechanism" refers to a mechanism that acts to block or otherwise inhibit heat transfer between the glass ribbon and a heating mechanism or a cooling mechanism. For example, when a shielding mechanism is positioned between the glass ribbon and a cooling mechanism, the shielding mechanism acts to block or otherwise inhibit the view factor between the glass ribbon and the cooling mechanism, thereby reducing the amount of radiation heat transfer between the glass ribbon and the cooling mechanism.

As used herein, the term "housing" refers to an enclosure in which a glass ribbon is drawn, wherein as the glass ribbon travels through the housing, it generally cools from a relatively higher to relatively lower temperature. While embodiments disclosed herein have been described with reference to a fusion down draw process, wherein a glass ribbon flows down through the housing in a generally vertical direction, it is to be understood that such embodiments are also applicable to other glass forming processes, such as float processes, slot draw processes, up-draw processes, and press-rolling processes, wherein the glass ribbon may flow through the housing in a variety of directions, such as a generally vertical direction or a generally horizontal direction.

Figure 1:
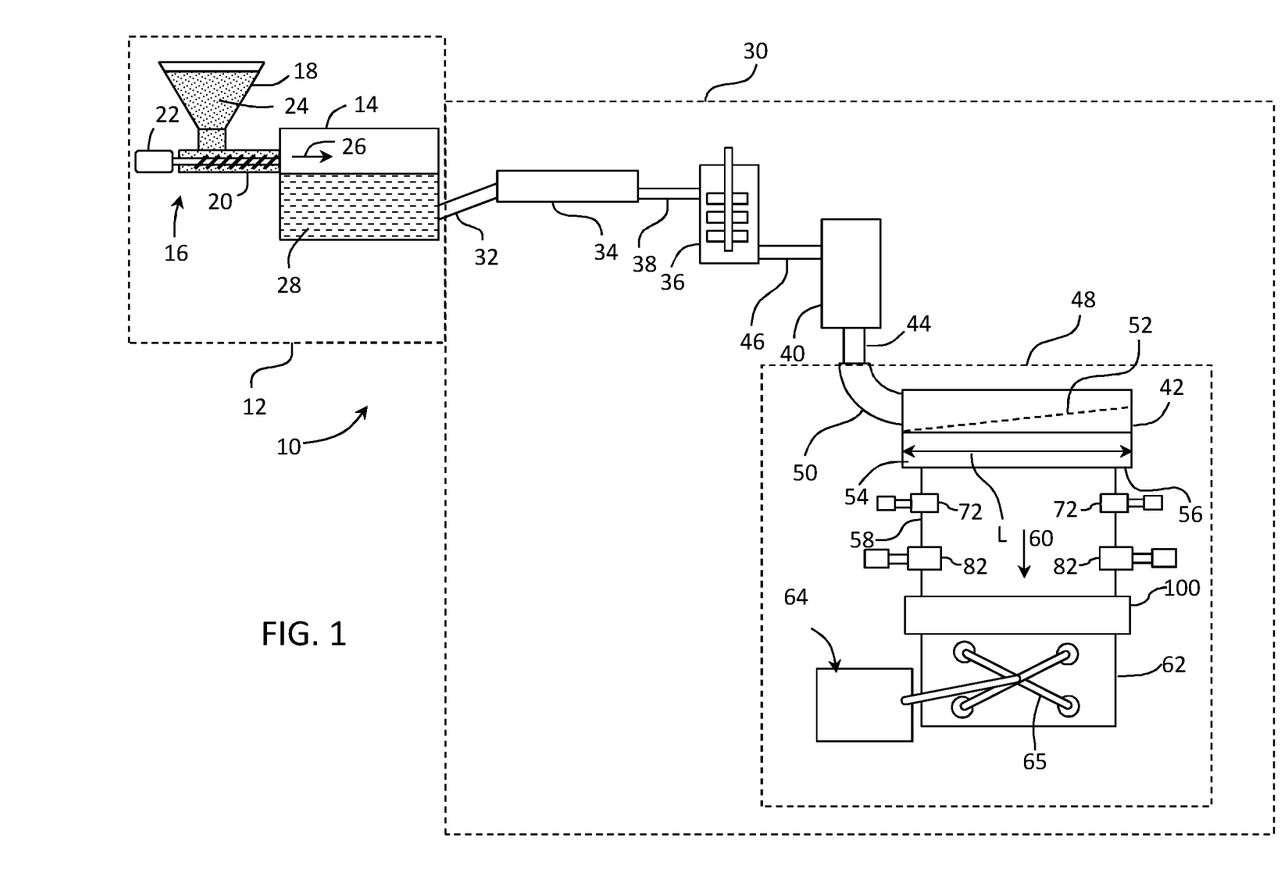
FIG. 1 is a schematic view of an example fusion down draw glass making apparatus and process.

Shown in FIG. 1 is an exemplary glass manufacturing apparatus 10. In some examples, the glass manufacturing apparatus 10 can comprise a glass melting furnace 12 that can include a melting vessel 14. In addition to melting vessel 14, glass melting furnace 12 can optionally include one or more additional components such as heating elements (e.g., combustion burners or electrodes) that heat raw materials and convert the raw materials into molten glass. In further examples, glass melting furnace 12 may include thermal management devices (e.g., insulation components) that reduce heat lost from a vicinity of the melting vessel. In still further examples, glass melting furnace 12 may include electronic devices and/or electromechanical devices that facilitate melting of the raw materials into a glass melt. Still further, glass melting furnace 12 may include support structures (e.g., support chassis, support member, etc.) or other components.

Glass melting vessel 14 is typically comprised of refractory material, such as a refractory ceramic material, for example a refractory ceramic material comprising alumina or zirconia. In some examples glass melting vessel 14 may be constructed from refractory ceramic bricks. Specific embodiments of glass melting vessel 14 will be described in more detail below.

In some examples, the glass melting furnace may be incorporated as a component of a glass manufacturing apparatus to fabricate a glass substrate, for example a glass ribbon of a continuous length. In some examples, the glass melting furnace of the disclosure may be incorporated as a component of a glass manufacturing apparatus comprising a slot draw apparatus, a float bath apparatus, a down-draw apparatus such as a fusion process, an up-draw apparatus, a press-rolling apparatus, a tube drawing apparatus or any other glass manufacturing apparatus that would benefit from the aspects disclosed herein. By way of example, FIG. 1 schematically illustrates glass melting furnace 12 as a component of a fusion down-draw glass manufacturing apparatus 10 for fusion drawing a glass ribbon for subsequent processing into individual glass sheets.

The glass manufacturing apparatus 10 (e.g., fusion down-draw apparatus 10) can optionally include an upstream glass manufacturing apparatus 16 that is positioned upstream relative to glass melting vessel 14. In some examples, a portion of, or the entire upstream glass manufacturing apparatus 16, may be incorporated as part of the glass melting furnace 12.

As shown in the illustrated example, the upstream glass manufacturing apparatus 16 can include a storage bin 18, a raw material delivery device 20 and a motor 22 connected to the raw material delivery device. Storage bin 18 may be configured to store a quantity of raw materials 24 that can be fed into melting vessel 14 of glass melting furnace 12, as indicated by arrow 26. Raw materials 24 typically comprise one or more glass forming metal oxides and one or more modifying agents. In some examples, raw material delivery device 20 can be powered by motor 22 such that raw material delivery device 20 delivers a predetermined amount of raw materials 24 from the storage bin 18 to melting vessel 14. In further examples, motor 22 can power raw material delivery device 20 to introduce raw materials 24 at a controlled rate based on a level of molten glass sensed downstream from melting vessel 14. Raw materials 24 within melting vessel 14 can thereafter be heated to form molten glass 28.

Glass manufacturing apparatus 10 can also optionally include a downstream glass manufacturing apparatus 30 positioned downstream relative to glass melting furnace 12. In some examples, a portion of downstream glass manufacturing apparatus 30 may be incorporated as part of glass melting furnace 12. In some instances, first connecting conduit 32 discussed below, or other portions of the downstream glass manufacturing apparatus 30, may be incorporated as part of glass melting furnace 12. Elements of the downstream glass manufacturing apparatus, including first connecting conduit 32, may be formed from a precious metal. Suitable precious metals include platinum group metals selected from the group of metals consisting of platinum, iridium, rhodium, osmium, ruthenium and palladium, or alloys thereof. For example, downstream components of the glass manufacturing apparatus may be formed from a platinum-rhodium alloy including from about 70 to about 90% by weight platinum and about 10% to about 30% by weight rhodium. However, other suitable metals can include molybdenum, palladium, rhenium, tantalum, titanium, tungsten and alloys thereof.

Downstream glass manufacturing apparatus 30 can include a first conditioning (i.e., processing) vessel, such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. For instance, gravity may cause molten glass 28 to pass through an interior pathway of first connecting conduit 32 from melting vessel 14 to fining vessel 34. It should be understood, however, that other conditioning vessels may be positioned downstream of melting vessel 14, for example between melting vessel 14 and fining vessel 34. In some embodiments, a conditioning vessel may be employed between the melting vessel and the fining vessel wherein molten glass from a primary melting vessel is further heated to continue the melting process, or cooled to a temperature lower than the temperature of the molten glass in the melting vessel before entering the fining vessel.

Bubbles may be removed from molten glass 28 within fining vessel 34 by various techniques. For example, raw materials 24 may include multivalent compounds (i.e. fining agents) such as tin oxide that, when heated, undergo a chemical reduction reaction and release oxygen. Other suitable fining agents include without limitation arsenic, antimony, iron and cerium. Fining vessel 34 is heated to a temperature greater than the melting vessel temperature, thereby heating the molten glass and the fining agent. Oxygen bubbles produced by the temperature-induced chemical reduction of the fining agent(s) rise through the molten glass within the fining vessel, wherein gases in the molten glass produced in the melting furnace can diffuse or coalesce into the oxygen bubbles produced by the fining agent. The enlarged gas bubbles can then rise to a free surface of the molten glass in the fining vessel and thereafter be vented out of the fining vessel. The oxygen bubbles can further induce mechanical mixing of the molten glass in the fining vessel.

Downstream glass manufacturing apparatus 30 can further include another conditioning vessel such as a mixing vessel 36 for mixing the molten glass. Mixing vessel 36 may be located downstream from the fining vessel 34. Mixing vessel 36 can be used to provide a homogenous glass melt composition, thereby reducing cords of chemical or thermal inhomogeneity that may otherwise exist within the fined molten glass exiting the fining vessel. As shown, fining vessel 34 may be coupled to mixing vessel 36 by way of a second connecting conduit 38. In some examples, molten glass 28 may be gravity fed from the fining vessel 34 to mixing vessel 36 by way of second connecting conduit 38. For instance, gravity may cause molten glass 28 to pass through an interior pathway of second connecting conduit 38 from fining vessel 34 to mixing vessel 36. It should be noted that while mixing vessel 36 is shown downstream of fining vessel 34, mixing vessel 36 may be positioned upstream from fining vessel 34. In some embodiments, downstream glass manufacturing apparatus 30 may include multiple mixing vessels, for example a mixing vessel upstream from fining vessel 34 and a mixing vessel downstream from fining vessel 34. These multiple mixing vessels may be of the same design, or they may be of different designs.

Downstream glass manufacturing apparatus 30 can further include another conditioning vessel such as delivery vessel 40 that may be located downstream from mixing vessel 36. Delivery vessel 40 may condition molten glass 28 to be fed into a downstream forming device. For instance, delivery vessel 40 can act as an accumulator and/or flow controller to adjust and/or provide a consistent flow of molten glass 28 to forming body 42 by way of exit conduit 44. As shown, mixing vessel 36 may be coupled to delivery vessel 40 by way of third connecting conduit 46. In some examples, molten glass 28 may be gravity fed from mixing vessel 36 to delivery vessel 40 by way of third connecting conduit 46. For instance, gravity may drive molten glass 28 through an interior pathway of third connecting conduit 46 from mixing vessel 36 to delivery vessel 40.

Downstream glass manufacturing apparatus 30 can further include forming apparatus 48 comprising the above-referenced forming body 42 and inlet conduit 50. Exit conduit 44 can be positioned to deliver molten glass 28 from delivery vessel 40 to inlet conduit 50 of forming apparatus 48. For example in examples, exit conduit 44 may be nested within and spaced apart from an inner surface of inlet conduit 50, thereby providing a free surface of molten glass positioned between the outer surface of exit conduit 44 and the inner surface of inlet conduit 50. Forming body 42 in a fusion down draw glass making apparatus can comprise a trough 52 positioned in an upper surface of the forming body and converging forming surfaces 54 that converge in a draw direction along a bottom edge 56 of the forming body. Molten glass delivered to the forming body trough via delivery vessel 40, exit conduit 44 and inlet conduit 50 overflows side walls of the trough and descends along the converging forming surfaces 54 as separate flows of molten glass. The separate flows of molten glass join below and along bottom edge 56 to produce a single ribbon of glass 58 that is drawn along the illustrated ribbon path defined by the downstream glass manufacturing apparatus 30. The single ribbon of glass 58 is drawn along the ribbon path in a draw or flow direction 60 from bottom edge 56 by applying tension to the glass ribbon, such as by gravity, edge rolls 72 and pulling rolls 82, to control the dimensions of the glass ribbon as the glass cools and a viscosity of the glass increases. Accordingly, glass ribbon 58 goes through a visco-elastic transition and acquires mechanical properties that give the glass ribbon 58 stable dimensional characteristics. Glass ribbon 58 may, in some embodiments, be separated into individual glass sheets 62 by a glass separation apparatus 100 in an elastic region of the glass ribbon. A robot 64 may then transfer the individual glass sheets 62 to a conveyor system using gripping tool 65, whereupon the individual glass sheets may be further processed.

Figure 2:
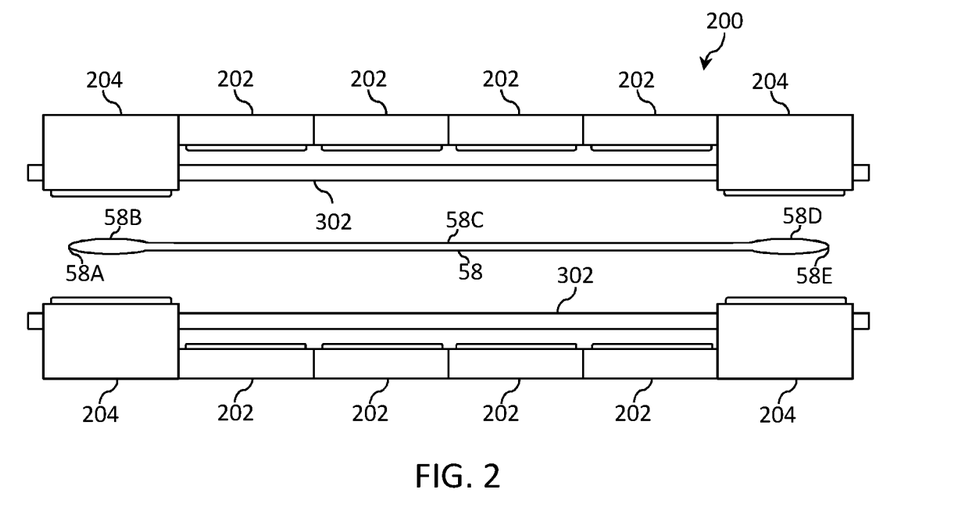
FIG. 2 is a top cutaway schematic view of a thermal management system located at a transition region in a glass making apparatus according to embodiments disclosed herein.

FIG. 2 is a top cutaway schematic view of a thermal management system located at a transition region 200 in a glass making apparatus according to embodiments disclosed herein. In the embodiment of FIG. 2, glass ribbon 58 includes a first edge 58A, a second edge 58E on the opposite side of the glass ribbon as the first edge in the widthwise direction, a central region 58C extending between the first edge 58A and the second edge 58E in the widthwise direction, a first bead region 58B extending between the first edge 58A and the central region 58C in the widthwise direction, and a second bead region 58D extending between the second edge 58E and the central region 58C in the widthwise direction. As further illustrated in FIG. 2, the ribbon path comprises a first bead path along which the first bead region 58B travels, a second bead bath along which the second bead region 58D travels, wherein the second bead path is opposite the first bead path in the widthwise direction. As still further illustrated in FIG. 2, the ribbon path further comprises a central path along which the central region 58C travels, wherein the central path extends between the first bead path and the second bead path in the widthwise direction.

Transition region 200 includes a heating mechanism comprising a plurality of heaters 202, each heater 202 representing an independently controllable heating zone configured to apply heat from a heat source to (i.e., in the direction of) the glass ribbon 58. While not limited to any specific type of heater, in certain exemplary embodiments, heaters 202 may comprise at least one of electrical resistance heaters and induction heaters.

For example, when heaters 202 comprise electrical resistance heaters, they may comprise electrically resistive heating elements available from Kanthal. In certain embodiments, the heating elements may comprise at least one material selected from the group consisting of molybdenum disilicide ($MoSi_2$) and alloys of iron, chromium, and aluminum (FeCrAl). Temperatures of electrical heating elements, when in operation, may, for example, range from 700° C. to 1,900° C., such as from 1,000° C. to 1,800° C., and further such as from 1,300° C. to 1,700° C.

Heaters 202 may be each individually controlled so as to apply the same or varying amounts of heat across the widthwise direction of at least the central region 58C of the glass ribbon 58. For example, depending on the desired processing characteristics of the glass ribbon 58, heaters 202 may be operated according to a control scheme or algorithm that takes into account such factors as glass composition, glass ribbon temperature, glass ribbon viscosity, glass ribbon thickness, glass ribbon width, glass ribbon flow rate, and so forth.

Transition region 200 also includes a cooling mechanism that extends between the heating mechanism and the glass ribbon 58 across the widthwise direction of at least the central region 58C of the glass ribbon 58. In the embodiment of FIG. 2, cooling mechanism includes conduits 302 with a cooling fluid flowing there through. As shown in FIG. 2, conduits 302 are each in direct view of the glass ribbon 58 across the widthwise direction of at least the central region 58C of the glass ribbon 58.

In certain exemplary embodiments, the cooling fluid flowing through conduits 302 can comprise a liquid, such as water. In certain exemplary embodiments, the cooling fluid flowing through conduits 302 can comprise a gas, such as air. And while FIGS. 2-8 show conduits 302 with a generally circular cross section, it is to be understood that embodiments disclosed herein include those in which conduits have other cross-sectional geometries such as elliptical or polygonal. Moreover, it is to be understood that embodiments disclosed herein include those in which the diameter or cross-sectional area of each conduit 302 is approximately the same or varies along its longitudinal length, depending on the desired amount of heat transfer from the glass ribbon 58, such as when differing amounts of heat transfer are desired from the glass ribbon 58 in its widthwise direction. In addition, embodiments disclosed herein include those in which the longitudinal length of each conduit 302 is the same or different and may or may not entirely extend across the glass ribbon 58 in its widthwise direction.

Exemplary materials for conduits 302 include those that possess good mechanical and oxidation properties at elevated temperatures, including various steel alloys, including stainless steel, such as 300 series stainless steel.

Embodiments disclosed herein also include those in which a high emissivity coating is deposited on at least part of an outside surface of each conduit 302 in order to affect the radiation heat transfer between the glass ribbon 58 and the conduit 302, wherein the same or different coatings may be deposited on the outside surface of each conduit 302 along its longitudinal length, depending on the desired amount of heat transfer from the glass ribbon 58. Exemplary high emissivity coatings should be stable at elevated temperatures and have good adherence to materials such as stainless steel. An exemplary high emissivity coating is M700 Black coating available from Cetek.

Each conduit 302 can include one or more fluid channels extending along at least a portion of their longitudinal lengths, including embodiments in which at least one channel circumferentially surrounds at least one other channel, such as when a cooling fluid is introduced into the conduit at a first end, flows along at least a portion of the longitudinal length of the conduit along a first channel and then flows back to the first end of the conduit along a second channel that either circumferentially surrounds or is circumferentially surrounded by the first channel. These and additional exemplary embodiments of conduits 302 are, for example, described in WO2006/044929A1, the entire disclosure of which is incorporated herein by reference.

Other cooling mechanisms that can be used with embodiments disclosed herein include those that include a plurality of cooling coils positioned along a cooling axis extending transverse to a flow direction 60 of the glass ribbon 58, such as those, for example, described in WO2012/174353A2, the entire disclosure of which is incorporated herein by reference. Such cooling coils could be used in combination with and/or in substitution for conduits 302.

Cooling mechanisms can additionally include those that utilize an evaporative cooling effect for the purposes of enhancing heat transfer, such as radiation heat transfer, from the glass ribbon 58. Such cooling mechanisms can, for example, include an evaporator unit that includes a liquid reservoir configured to receive a working liquid, such as water, and a heat transfer element configured to be placed in thermal contact with the working liquid received in the liquid reservoir, wherein the heat transfer element can be configured to cool the glass ribbon 58 by receiving radiant heat from the glass ribbon 58 and transferring the heat to the working liquid received in the liquid reservoir, thereby transforming an amount of the working liquid to a vapor. These and additional exemplary embodiments of cooling mechanisms utilizing an evaporative cooling effect are, for example, described in U.S. 2016/0046518A1, the entire disclosure of which is incorporated herein by reference.

In addition, cooling mechanisms can include convection cooling mechanism, such as those that include at least one vacuum port configured to promote convection cooling of the glass ribbon 58 with a cooling fluid flow generated at least partially by operation of the vacuum port. For example, the convective cooling mechanism can include a plurality of vacuum ports extending in the same direction as the widthwise direction of the glass ribbon 58. In such embodiments, each of the plurality of vacuum ports can include an adjustable flow control device configured to adjust fluid flow through the corresponding vacuum port. These and additional exemplary embodiments of vacuum ports are, for example, described in WO2014/193780A1, the entire disclosure of which is incorporated herein by reference.

Transition region 200 also includes a shielding mechanism extending between the cooling mechanism and at least one of first and second bead regions 58B, 58D, of the glass ribbon 58. In the embodiment of FIG. 2, shielding mechanism includes extended heaters 204 that extend between each of first and second bead regions 58B, 58D and cooling mechanism comprising conduits 302. Because extended heaters 204 extend between each of first and second bead regions 58B, 58D and conduits 302, they block a direct view between first and second bead regions 58B, 58D and conduits 302, thereby inhibiting radiation heat transfer between bead regions 58B, 58D, and conduits 302.

As with heaters 202, extended heaters 204 may be independently controllable and may comprise at least one of electrical resistance heaters and induction heaters as described herein. For example, depending on the desired processing characteristics of the glass ribbon 58, extended heaters 204 may be operated in concert with heaters 202 according to a control scheme or algorithm that takes into account such factors as glass composition, glass ribbon temperature, glass ribbon viscosity, glass ribbon thickness, glass ribbon width, glass ribbon flow rate, and so forth.

Accordingly, embodiments disclosed herein include those in which, in a transition region 200, there is a direct view between the glass ribbon 58 and a cooling mechanism (e.g., conduits 302) across the widthwise direction of at least the central region 58C of the glass ribbon 58 whereas there is not a direct view between the first and second bead regions 58B, 58D, of the glass ribbon 58 and the cooling mechanism (e.g., conduits 302). Meanwhile, a heating mechanism can be operated in concert with the cooling mechanism wherein, as shown in FIG. 2, the heating mechanism comprises heaters 202 that are in farther proximity to the central region 58C of the glass ribbon 58 than is the cooling mechanism (e.g., conduits 302). These mechanisms can, in turn, be operated in concert with a shielding mechanism that comprises extended heaters 204 that are in closer proximity to the first and second bead regions 58B, 58D, of the glass ribbon 58 than is the cooling mechanism (e.g., conduits 302). Operation of these mechanisms in concert can enable a relatively higher amount of radiation heat transfer from central region 58C of the glass ribbon 58 relative to the first and second bead regions 58B, 58D than would otherwise occur, while, at the same time, enabling fine tuning of the overall cooling of the glass ribbon 58.

Figure 3:
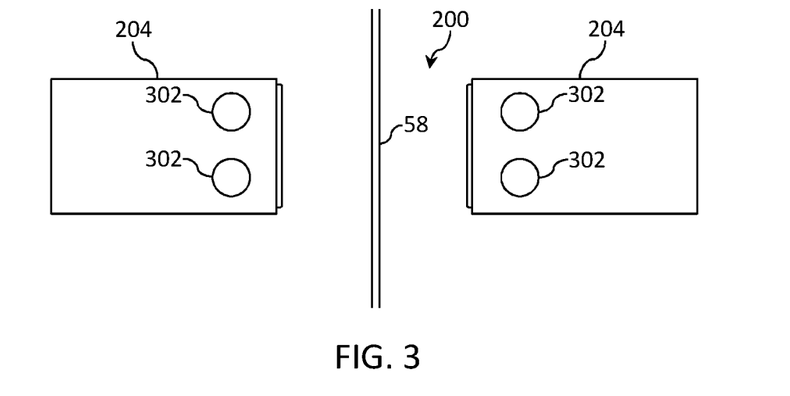
FIG. 3 is an end cutaway schematic view of a thermal management system of the embodiment illustrated in FIG. 2.
Figure 4:
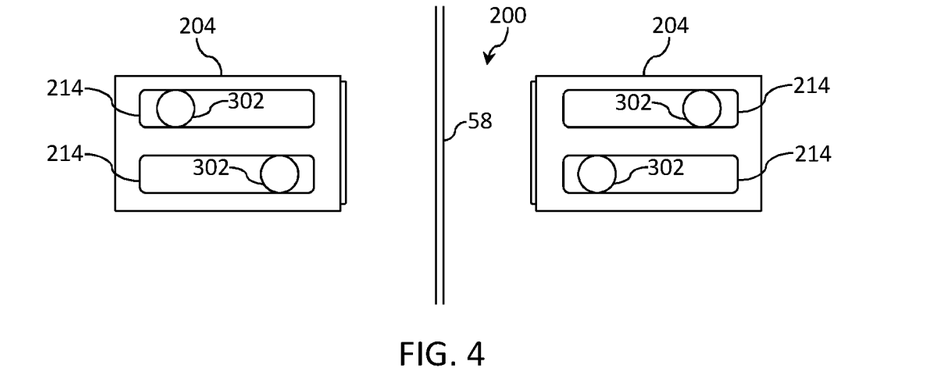
FIG. 4 is an end cutaway schematic view of a thermal management system having a moveable cooling mechanism according to embodiments disclosed herein.

Fine tuning of the overall cooling of glass ribbon 58 can be further enhanced through use of adjustable cooling mechanisms, as disclosed herein. FIGS. 3-6 illustrate end cutaway schematic views of exemplary embodiments of thermal management systems in transition region 200 having differing cooling mechanism configurations. For example, FIG. 3 illustrates a thermal management system wherein conduits 302 extend through extended heaters 204 and are fixed in a set position. In contrast, FIG. 4 illustrates a thermal management system wherein conduits 302 extend through extended heaters 204 and are moveable along slots 214 between at least first and second positions, wherein the first position is closer to the glass ribbon 58 than is the second position.

Figure 5:
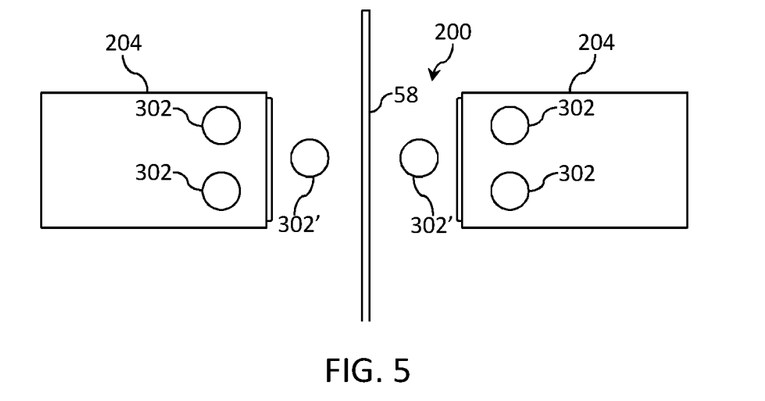
FIG. 5 is an end cutaway schematic view of a thermal management system similar to the embodiment illustrated in FIG. 3 and further including a supplemental cooling mechanism.
Figure 6:
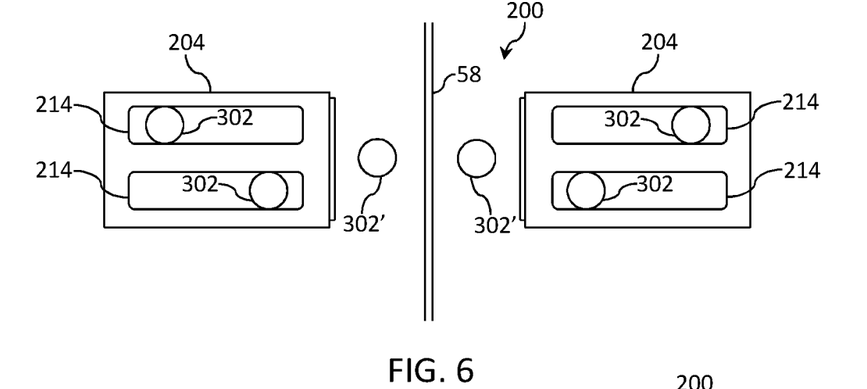
FIG. 6 is an end cutaway schematic view of a thermal management system similar to the embodiment illustrated in FIG. 4 and further including a supplemental cooling mechanism.

FIG. 5 illustrates a thermal management system that is similar to that shown in FIG. 3 except cooling mechanism further includes a supplemental cooling mechanism, comprising supplemental conduits 302', which are configured to extend along the width of the glass ribbon 58, including between the shielding mechanism (e.g., extended heaters 204) and at least one of the first and second bead regions, 58B, 58D of the glass ribbon 58. Similarly, FIG. 6 illustrates a thermal management system that is similar to that shown in FIG. 4 except cooling mechanism further includes a supplemental cooling mechanism, comprising supplemental conduits 302', which are configured to extend along the width of the glass ribbon 58, including between the shielding mechanism (e.g., extended heaters 204) and at least one of the first and second bead regions, 58B, 58D of the glass ribbon 58.

In each of the embodiments illustrated in FIGS. 3-6, conduits 302 and/or 302' may each have the same or different cooling fluid flowing there through. For example, in some exemplary embodiments, some conduits may have a gas, such as air, flowing there through, whereas other conduits may have a liquid, such as water, flowing there through. For example, in certain exemplary embodiments, at least one of conduits 302 may have a liquid, such as water, flowing there through while at least one of conduits 302' may have a gas, such as air, flowing there through. In addition, in certain exemplary embodiments, at least one of conduits 302 may have a gas, such as air, flowing there through while at least one of conduits 302' may have a liquid, such as water, flowing there through.

Figure 7A:
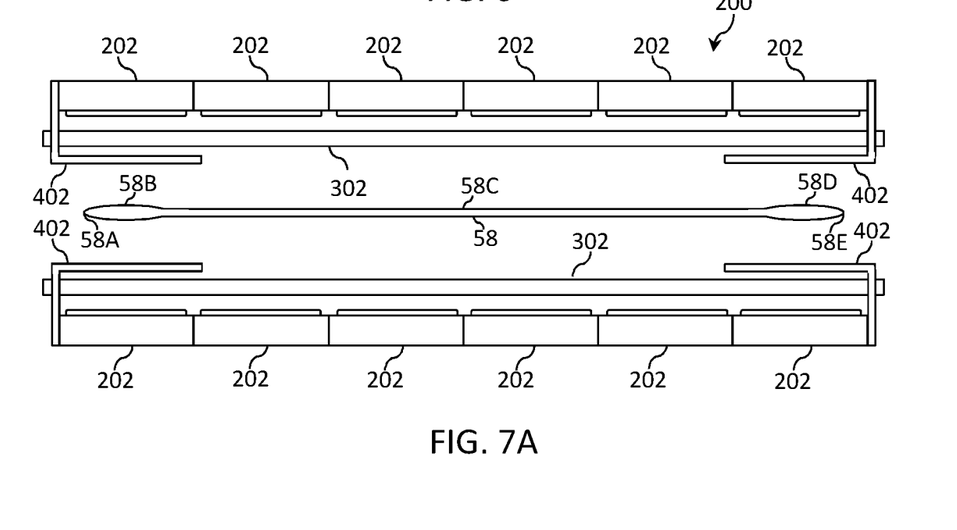
FIG. 7A is a top cutaway schematic view of a thermal management system located at a transition region including a removable and re-attachable shielding mechanism according to embodiments disclosed herein.

FIG. 7A is a top cutaway schematic view of a thermal management system located at a transition region 200 that includes a removable and re-attachable shielding mechanism 402 according to embodiments disclosed herein. Removable and re-attachable shielding mechanism 402 can be repeatedly attached, removed, and re-attached to the thermal management system, for example, by being inserted into or removed from a slot (not shown) located in an end region of transition region 200. As with extended heaters 204 shown in FIGS. 2-6, removable and re-attachable shielding mechanism 402 extends between the cooling mechanism (e.g., conduits 302) and at least one of first and second bead regions 58B, 58D, of the glass ribbon 58.

Removable and re-attachable shielding mechanism 402 can aid in further fine tuning the overall cooling of glass ribbon 58, particularly first and/or second bead regions 58B and/or 58D. For example, when removable and re-attachable shielding mechanism 402 is positioned between the bead regions, 58B, 58D of glass ribbon 58 and a cooling mechanism (e.g., conduits 302), as shown, for example, in FIG. 7A, the shielding mechanism acts to block or otherwise inhibit the view factor between the bead regions, 58B, 58D and the cooling mechanism (e.g., conduits 302), thereby reducing the amount of radiation heat transfer between the bead regions 58B, 58D and the cooling mechanism (e.g., conduits 302).

Figure 7B:
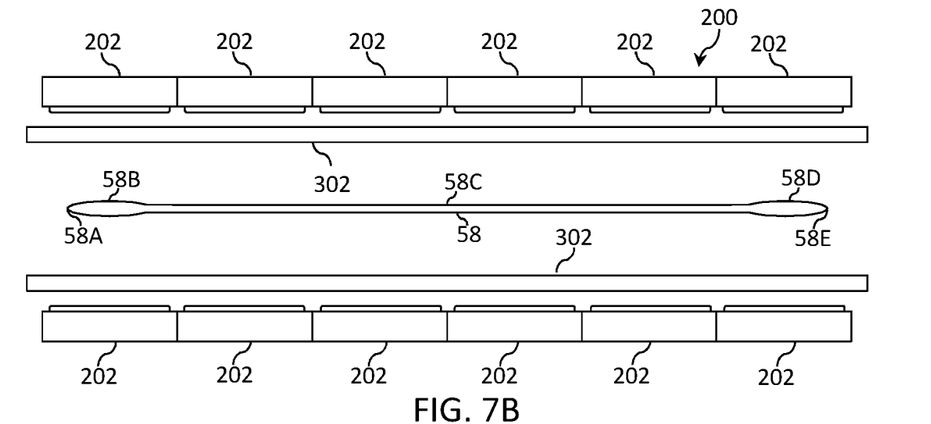
FIG. 7B is a top cutaway schematic view of the thermal management system of FIG. 7A wherein the removable and re-attachable shielding mechanism has been removed.

Conversely, as shown in FIG. 7B, when removable and re-attachable shielding mechanism 402 is removed, a view factor between the bead regions 58B, 58D and the cooling mechanism (e.g., conduits 302) can enable a relatively greater amount of radiation heat transfer between the bead regions 58B, 58D and the cooling mechanism.

Removable and re-attachable shielding mechanism 402 can be comprised of a material that possesses good mechanical and oxidation properties at elevated temperatures, including various metal alloys, such as steel alloys, including stainless steel, such as 300 series stainless steel. Removable and re-attachable shielding mechanism 402 may also be comprised of a refractory material such as silicon carbide. In the embodiment illustrated in FIG. 7A, removable and re-attachable shielding mechanism 402 does not include an active heating element. In such embodiments, removable and re-attachable shielding mechanism 402 may be coated with a low emissivity coating, such as a coating comprising at least one material selected from aluminum and silver.

Figure 8A:
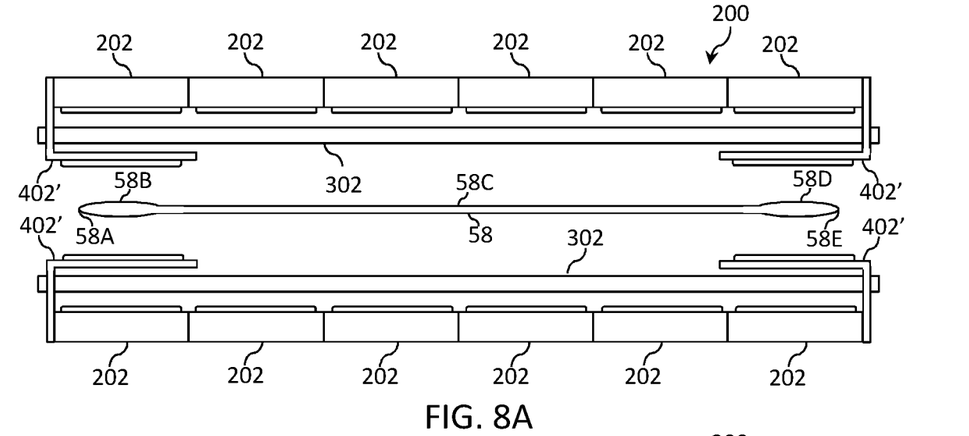
FIG. 8A is a top cutaway schematic view of a thermal management system similar to the embodiment illustrated in FIG. 7A wherein the shielding mechanism includes a heating mechanism.

The embodiment illustrated in FIG. 8A is the same as the embodiment illustrated in FIG. 7A except removable and re-attachable shielding mechanism 402' includes a heating mechanism comprising an active heating element, such as, for example, at least one of electrical resistance heaters and induction heaters.

Figure 8B:
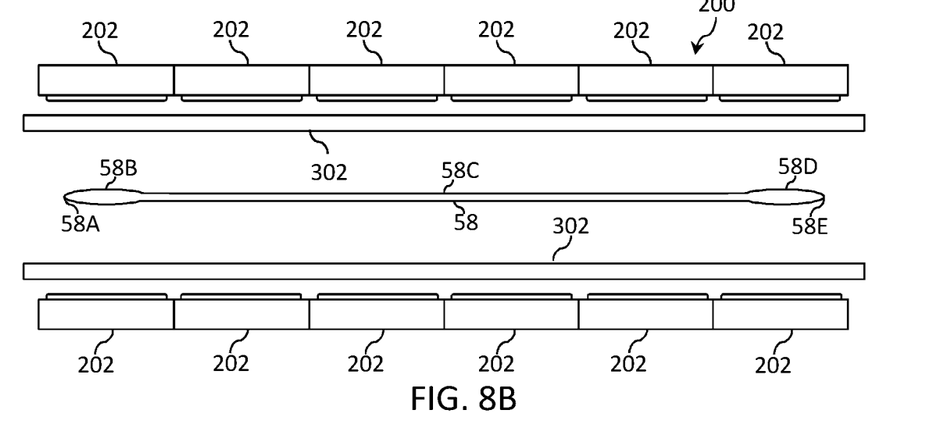
FIG. 8B is a top cutaway schematic view of the thermal management system of FIG. 8A wherein the removable and re-attachable shielding mechanism has been removed.

The embodiment illustrated in FIG. 8B is the same as the embodiment illustrated in FIG. 8A except removable and re-attachable shielding mechanism 402' has been removed.

Embodiments disclosed herein can enable more uniform heat transfer of a glass ribbon while it is being cooled while accounting for differences in ribbon thickness, such as where bead regions of the ribbon are thicker than the central region of the ribbon. This can, in turn, mitigate undesirable effects, such as out of plane shape and excessive stress gradients, which can, in turn, result in sheet breakage, as the glass ribbon continues to cool.

While the above embodiments have been described with reference to a fusion down draw process, it is to be understood that such embodiments are also applicable to other glass forming processes, such as float processes, slot draw processes, up-draw processes, and press-rolling processes.

It will be apparent to those skilled in the art that various modifications and variations can be made to embodiment of the present disclosure without departing from the spirit and scope of the disclosure. Thus it is intended that the present disclosure cover such modifications and variations provided they come within the scope of the appended claims and their equivalents.

What is claimed is:

1. An apparatus for manufacturing a glass article comprising:
   a transition region to house a glass ribbon, said glass ribbon having a ribbon path,
   the ribbon path comprising a first bead path, a second bead path opposite the first bead path in a widthwise direction, and a central path extending between the first bead path and the second bead path in the widthwise direction,
   a heating mechanism positioned at an elevation of the transition region and configured to apply heat from a heat source toward the ribbon path; and
   a cooling mechanism positioned at the elevation and extending between the heating mechanism and the ribbon path; and
   a shielding mechanism positioned at the elevation and configured to extend between the cooling mechanism and at least one of the first bead path or the second bead path; and no shielding mechanism is provided at the elevation between the cooling mechanism and the central path,
   wherein the apparatus is configured to draw a portion of a glass ribbon along the ribbon path with a first bead region of the glass ribbon traveling along the first bead path, a second bead region of the glass ribbon traveling along the second bead path, and a central region of the glass ribbon traveling along the central path.

2. The apparatus of claim 1, wherein the cooling mechanism comprises a conduit with a cooling fluid flowing there through.

3. The apparatus of claim 2, wherein the cooling fluid comprises a liquid.

4. The apparatus of claim 1, wherein the heating mechanism comprises an electrical resistance heater.

5. The apparatus of claim 1, wherein the heating mechanism comprises a plurality of independently controllable heating zones.

6. The apparatus of claim 1, wherein the shielding mechanism extends between the cooling mechanism and both the first bead path and the second bead path.

7. The apparatus of claim 1, wherein the shielding mechanism comprises a supplemental heating mechanism.

8. The apparatus of claim 1, wherein the shielding mechanism is removable and re-attachable.

9. The apparatus of claim 1, wherein the cooling mechanism is moveable between at least first and second positions, wherein the first position is configured to be closer to the ribbon path than the second position.

10. The apparatus of claim 1, further comprising a supplemental cooling mechanism configured to extend between the shielding mechanism and at least one of the first bead path or the second bead path.

11. A glass article made by the apparatus of claim 1.

12. An electronic device comprising the glass article of claim 11.

* * * * *